(12) United States Patent
Kuenzi et al.

(10) Patent No.: US 11,368,845 B2
(45) Date of Patent: Jun. 21, 2022

(54) SECURE SEAMLESS ACCESS CONTROL (71) Applicant: Carrier Corporation, Palm Beach Gardens, FL (US)

(72) Inventors: Adam Kuenzi, Silverton, OR (US); Adam Purdue, Salem, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 125 days.

(21) Appl. No.: 16/190,245

(22) Filed: Nov. 14, 2018

(65) Prior Publication Data

US 2019/0182672 A1    Jun. 13, 2019

Related U.S. Application Data

(60) Provisional application No. 62/596,139, filed on Dec. 8, 2017.

(51) Int. Cl.
| | |
|---|---|
| *H04W 76/10* | (2018.01) |
| *H04W 12/084* | (2021.01) |
| *H04W 4/02* | (2018.01) |
| *G07C 9/00* | (2020.01) |
| *H04W 12/065* | (2021.01) |
| *H04W 12/06* | (2021.01) |

(Continued)

(52) U.S. Cl.
CPC ...... *H04W 12/084* (2021.01); *G07C 9/00309* (2013.01); *H04L 63/0861* (2013.01); *H04W 4/02* (2013.01); *H04W 12/065* (2021.01); *H04W 12/068* (2021.01); *H04W 12/121* (2021.01); *H04W 76/10* (2018.02); *B60R 25/245* (2013.01); *G07C 2009/00357* (2013.01); *G07C 2009/00555* (2013.01); *G07C 2209/63* (2013.01)

(58) Field of Classification Search
CPC .................. H04W 12/0804; H04W 76/10
USPC ........................................... 726/5
See application file for complete search history.

(56) References Cited

U.S. PATENT DOCUMENTS

| | | |
|---|---|---|
| 6,014,085 A | 1/2000 | Patel |
| 6,992,568 B2 | 1/2006 | Perraud et al. |
| | (Continued) | |

FOREIGN PATENT DOCUMENTS

| | | |
|---|---|---|
| CN | 1813271 A | 8/2006 |
| EP | 2192559 A2 | 6/2010 |
| | (Continued) | |

OTHER PUBLICATIONS

US 8,482,383 B2, 07/2013, Ghabra et al. (withdrawn)
(Continued)

*Primary Examiner* — Anthony D Brown
(74) *Attorney, Agent, or Firm* — Cantor Colburn LLP (57) ABSTRACT

A method of secure access through a wireless connection is provided. The method includes detecting availability of an access control wirelessly by a mobile device. A predicted intent is determined of a user of the mobile device to have the access control open a lock. The method determines whether a relay attack is detected. Based on detection of the relay attack, a prompt to confirm an intent of the user of the mobile device to have the access control open a lock is determined. Based on non-detection of the relay attack, a lock actuator is activated through the access control to open the lock responsive to a credential based on affirmatively confirming the intent or the predicted intent.

17 Claims, 6 Drawing Sheets

(51) Int. Cl.
*H04W 12/121* (2021.01)
*H04L 9/40* (2022.01)
*B60R 25/24* (2013.01)

(56) References Cited

U.S. PATENT DOCUMENTS

| | | | |
|---|---|---|---|
| 7,420,455 | B2 | 9/2008 | Nowottnick |
| 7,783,451 | B2 | 8/2010 | Wilcox et al. |
| 7,791,457 | B2 | 9/2010 | Ghabra et al. |
| 8,045,961 | B2 | 10/2011 | Ayed et al. |
| 8,117,449 | B2 | 2/2012 | Blythe |
| 8,467,770 | B1 | 6/2013 | Ben Ayed |
| 8,595,810 | B1 | 11/2013 | Ben Ayed |
| 8,625,796 | B1 | 1/2014 | Ben Ayed |
| 8,930,045 | B2 | 1/2015 | Oman et al. |
| 9,008,917 | B2 | 4/2015 | Gautama et al. |
| 9,102,296 | B2 | 8/2015 | Seiberts et al. |
| 9,210,188 | B2 | 12/2015 | Choi et al. |
| 9,305,412 | B2 | 4/2016 | Winkelman |
| 9,336,637 | B2 | 5/2016 | Neil et al. |
| 9,349,236 | B2 | 5/2016 | Mutti et al. |
| 9,386,181 | B2 | 7/2016 | Fucci |
| 9,455,998 | B2 | 9/2016 | Ivanchykhin et al. |
| 9,558,607 | B2 | 1/2017 | Eder |
| 9,584,542 | B2 | 2/2017 | Kim et al. |
| 9,710,983 | B2 | 7/2017 | Asmar et al. |
| 9,786,110 | B2 | 10/2017 | Yamamoto et al. |
| 9,794,753 | B1 | 10/2017 | Stitt et al. |
| 10,791,444 | B2 | 9/2020 | Kuenzi |
| 2005/0264400 | A1 | 12/2005 | Fisher |
| 2007/0008088 | A1 | 1/2007 | Nantz et al. |
| 2009/0206989 | A1 | 8/2009 | Leitch |
| 2013/0271273 | A1 | 10/2013 | Oesterling |
| 2014/0067161 | A1 | 3/2014 | Conner et al. |
| 2014/0375420 | A1 | 12/2014 | Seiberts et al. |
| 2016/0027226 | A1 | 1/2016 | Gigl et al. |
| 2016/0075307 | A1 | 3/2016 | Jakobsson |
| 2016/0098874 | A1* | 4/2016 | Handville .......... G07C 9/00658 340/5.61 |
| 2016/0125675 | A1 | 5/2016 | Ziller |
| 2016/0140539 | A1 | 5/2016 | Ma et al. |
| 2016/0200291 | A1 | 7/2016 | Kim et al. |
| 2016/0349347 | A1 | 12/2016 | Hillan et al. |
| 2017/0074000 | A1* | 3/2017 | Banvait .................. B60R 16/02 |
| 2017/0190316 | A1 | 7/2017 | Kim |
| 2017/0272906 | A1 | 9/2017 | Kerai |
| 2018/0063170 | A1* | 3/2018 | Truve .................. H04L 63/1425 |
| 2019/0061686 | A1 | 2/2019 | Neuhoff et al. |

FOREIGN PATENT DOCUMENTS

| | | |
|---|---|---|
| EP | 2492875 A2 | 8/2012 |
| EP | 2800068 A2 | 11/2014 |
| EP | 3163925 A1 | 5/2017 |
| JP | 2015209707 A | 11/2015 |
| WO | 0125060 A2 | 4/2001 |
| WO | 2015191190 A1 | 12/2015 |
| WO | 2016177671 A1 | 11/2016 |
| WO | 2016193227 A1 | 12/2016 |
| WO | 2016202592 A1 | 12/2016 |
| WO | 2017181132 A2 | 10/2017 |

OTHER PUBLICATIONS

"Industry's Lowest-Power Vehicle Access Solution for Smart Keys and Wearables", Press Release, Microchip.com, Nov. 8, 2016, Accessed on Dec. 11, 2017 at https://www.microchip.com/pressreleasepage/lowest-power-vehicle-access-solution-PEPS (4 pp.).

Le, Khanh Tuan, "Bluetooth low energy and the automotive transformation", Texas Instruments, Sep. 2017, Accessed Dec. 11, 2017 at http://www.ti.com/lit/wp/sway008/sway008.pdf (10 pp.).

EP Application No. 18210668.2 Extended EP Search Report dated Apr. 25, 2019, 35 pages.

China Office Action for China Application No.: 201811495848.0; Application Filing Date: Dec. 7, 2018; dated Nov. 29, 2021; Report Received: Jan. 21, 2022, 13 pages.

European Office Action for European Application No.: 18210668.2; dated Mar. 31, 2022; Date Received: Apr. 26, 2022; 11 pages.

\* cited by examiner

SECURE SEAMLESS ACCESS CONTROL

CROSS-REFERENCE TO RELATED APPLICATION

This application claims the benefit of priority to U.S. Provisional Application No. 62/596,139 filed Dec. 8, 2017, the disclosure of which is incorporated herein by reference in its entirety.

BACKGROUND

The subject matter disclosed herein generally relates to the field of access control systems, and more particularly to an apparatus and method for establishing secure seamless access control.

Existing lock systems may allow a person to activate an access control to unlock a lock through a mobile device. Wireless protocols, such as Bluetooth, can enable wireless communication between a mobile device and an access control without the mobile device being directly next to the access control (e.g., within about a 10 meter radius). Access control systems that use wireless communication without requiring a direct interaction or confirmation step may be susceptible to relay attacks, where a pair of devices is used to relay communication between the mobile device and the access control while the mobile device is not in physical proximity to the access control (e.g., outside of the normal direct communication range between the mobile device and access control). An attacker and/or accomplice performing the relay can then access the previously locked area without the knowledge or consent of the user of the mobile device.

BRIEF SUMMARY

According to one embodiment, a method of providing secure access through a wireless connection includes detecting availability of an access control wirelessly by a mobile device. A predicted intent is determined of a user of the mobile device to have the access control open a lock. The method determines whether a relay attack is detected. Based on detection of the relay attack, a prompt to confirm an intent of the user of the mobile device to have the access control open a lock is determined. Based on non-detection of the relay attack, a lock actuator is activated through the access control to open the lock responsive to a credential based on affirmatively confirming the intent or the predicted intent.

In addition to one or more of the features described above or below, or as an alternative, further embodiments may include where determining whether the relay attack is detected includes confirming physical proximity of the access control to the mobile device by performing one or more of: verifying detection of at least two different signal power levels at the mobile device as transmitted by the access control, and confirming that a communication address of the access control matches an expected address value by the mobile device.

In addition to one or more of the features described above or below, or as an alternative, further embodiments may include where determining whether the relay attack is detected includes verifying whether a round-trip communication latency between the mobile device and the access control is at or below a predetermined latency limit.

In addition to one or more of the features described above or below, or as an alternative, further embodiments may include where determining whether the relay attack is detected includes comparing a current location of the access control to an expected location of the access control.

In addition to one or more of the features described above or below, or as an alternative, further embodiments may include where the expected location of the access control is determined based on one or more of: a position signal and a last known location of the access control.

In addition to one or more of the features described above or below, or as an alternative, further embodiments may include where determining whether the relay attack is detected includes verifying that an expected audio signal output by the access control is detected by a microphone of the mobile device.

In addition to one or more of the features described above or below, or as an alternative, further embodiments may include where determining whether the relay attack is detected includes determining a received signal strength indicator at the mobile device, and verifying whether the receive signal strength indicator at the mobile device matches a received signal strength indicator of the access control within a signal level tolerance.

In addition to one or more of the features described above or below, or as an alternative, further embodiments may include where determining whether the relay attack is detected includes receiving a biometric indicator from the access control of a person seeking access, and confirming whether the biometric indicator matches the user of the mobile device.

In addition to one or more of the features described above or below, or as an alternative, further embodiments may include where determining whether the relay attack is detected includes utilizing multiple communication channels having different communication range distances to confirm proximity and transmit data.

In addition to one or more of the features described above or below, or as an alternative, further embodiments may include where the access control is a component of a vehicle and the method includes verifying whether a location of the mobile device and a location of the vehicle remain aligned as the vehicle moves, performing a periodic re-authentication as the vehicle moves, and periodically confirming whether communication between the vehicle and the mobile device remains active.

According to another embodiment, an access control system includes an access control operable to control a lock actuator to open a lock, and a mobile device application executable by a mobile device. The access control system is configured to detect availability of the access control wirelessly by the mobile device, determine a predicted intent of a user of the mobile device to have the access control open the lock, and determine whether a relay attack is detected. Based on detection of the relay attack, a prompt is output to confirm an intent of the user of the mobile device to have the access control open the lock. Based on non-detection of the relay attack, the lock actuator is activated through the access control to open the lock responsive to a credential based on affirmatively confirming the intent or the predicted intent.

According to an embodiment, a method of providing seamless access through an access control includes detecting availability of the access control by a mobile device based on a position signal or a beacon signal. A received signal strength indicator of the access control is monitored at the mobile device. Intent of a user of the mobile device to have the access control open a lock is confirmed based on determining that the received signal strength indicator exceeds a threshold. A lock actuator is activated through the access control to open the lock responsive to a credential based on affirmatively confirming the intent.

Technical effects of embodiments of the present disclosure include enhancement of security features of an access control system to prevent/detect unauthorized access attempts.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
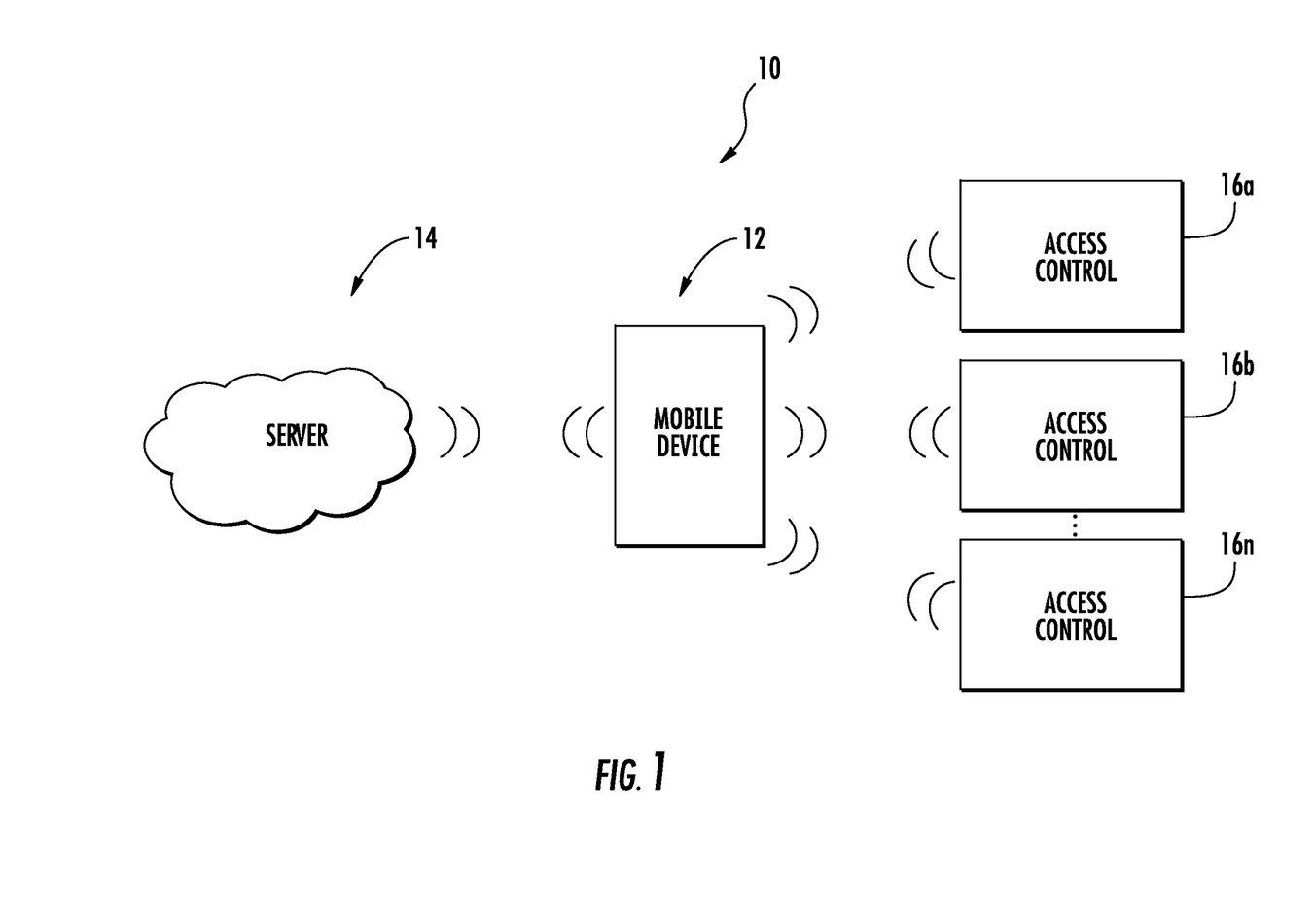
FIG. 1 illustrates a general schematic system diagram of a user authentication system, in accordance with an embodiment of the disclosure.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software. In an embodiment, the access controls 16 may control access through a door to a secured area, such as a room of a building. In another embodiment, the access controls 16 may control access through a vehicle door or storage compartment.

The mobile device 12 is a wireless capable handheld device such as a smartphone or tablet computer that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential.

A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
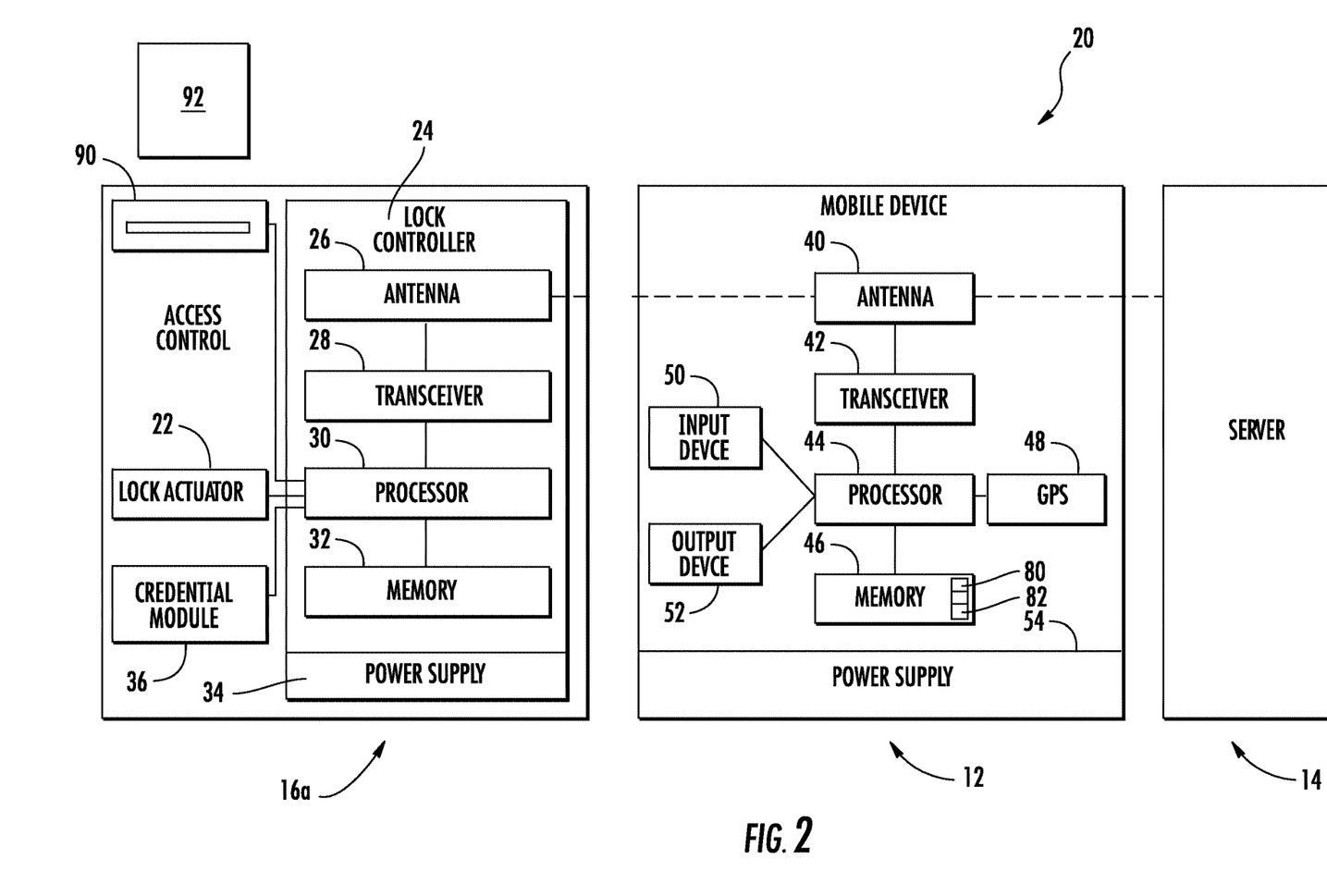
FIG. 2 illustrates a block diagram of the user authentication system, in accordance with an embodiment of the disclosure.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a may have essentially two readers, one reader 90 to read a physical key card 92 and the credential module 36 to communicate with the mobile device 12 via the lock processor 30 and the transceiver 28 and antenna 26. The access control 16a is responsive to credentials from the mobile device 12, and may, for example, be a door lock. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g., turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module 36. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28. In other embodiments, the credential module 36 may be a software module whole executed within the processor 30.

The mobile device 12 generally includes a key antenna 40, a key transceiver 42, a key processor 44, a key memory 46, a global positioning system (GPS) receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment, a mobile credential is retrieved in real time and is passed to the credential module 36 without storing first in the key memory 46 on the mobile device 12. The mobile device 12 may also include a mobile device application 80. Embodiments disclosed herein, may operate through the mobile device application 80 installed on the mobile device 12.

Figure 3:
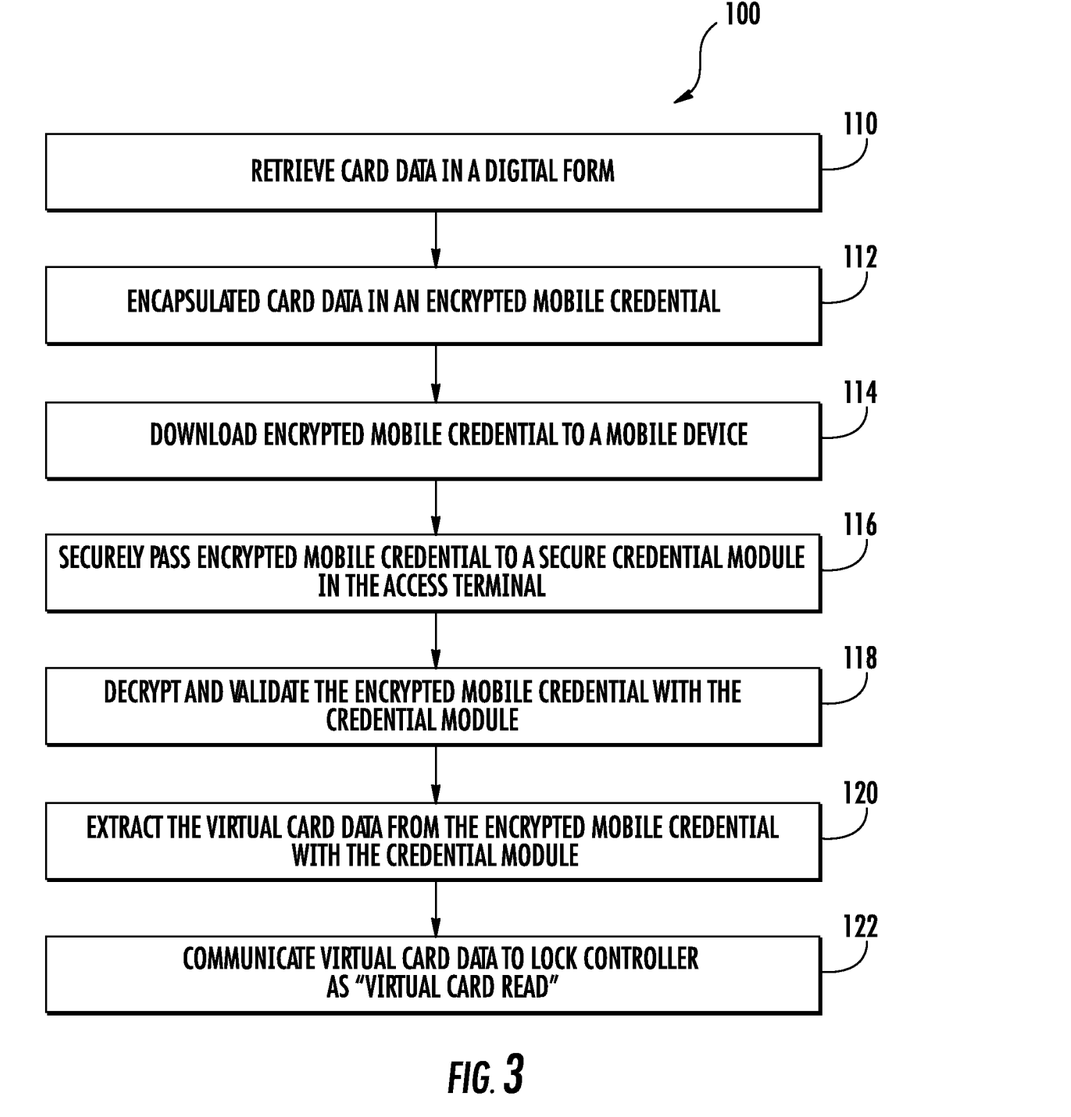
FIG. 3 is a flow diagram illustrating a credential management method performed by a user authentication system, according to an embodiment of the present disclosure.

With reference to FIG. 3, a method 100 to facilitate communication of a credential representative of data that would normally be physically encoded on the key card 92 is retrieved in a digital form (step 110), encapsulated in an encrypted credential (step 112), downloaded to the mobile device 12 (step 114), securely passed to the credential module 36 (step 116) that decrypts and validates the credential (step 118), extracts the virtual card data (step 120), then passes the virtual card data into the lock controller 24 as a "virtual card read" (step 122). This, for example, permits a user to bypass a front desk of a hotel and go directly to their room as will be further described. The encrypted credential may be generated by the server 14 using well-known techniques for digital certificate creation and encryption using cryptographic algorithms such as AES, ECC, RSA, and the like. For example, the credential may contain but is not limited to including a credential identifier, unique access control 16 identifier, unique credential module 36 identifier, an identifier shared with multiple access controls, a parameter indicating the type or format of the credential, it may contain encrypted data such as the virtual card data, and it may contain a digital signature. The encrypted data may be encrypted with an AES-128 encryption key that can be known to the credential module 36. Or it may be encrypted with a derived encryption key that can be determined from information contained in the credential. Further, the digital signature may be a CBC-MAC type signature based on an AES-128 encryption key, for example, that can be known by the credential module 36. Or, it could be a digital signature based on a private key known to the server 14 and can be validated by a public key known to the credential module 36.

Figure 4:
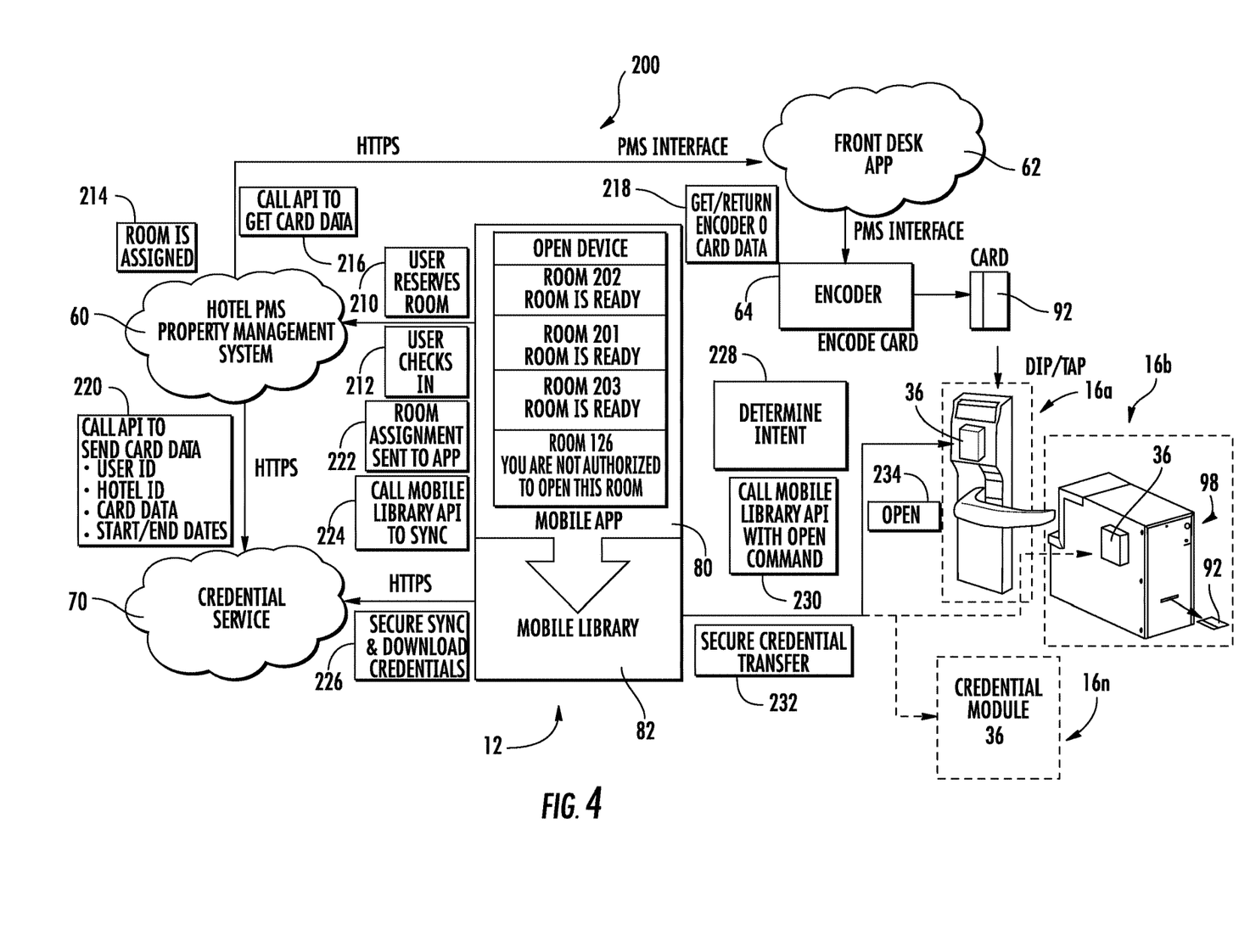
FIG. 4 is a flow diagram illustrating a credential management method, according to an embodiment of the present disclosure.

With reference to FIG. 4, one example bypass the front desk method 200, is initiated by a user who first reserves a hotel room (step 210) through any process supported by a hotel, such as mobile reservations, web sites, travel agents, etc. Later, a check-in procedure confirms their stay (step 212). Again, this can be performed through any process supported by the hotel.

Next, a room is assigned in a hotel property management system 60 based on the guest preferences (or room selection) and the room availability on check-in (step 214). The hotel property management system 60 may use a software-to-software application programming interface (API) provided by a front desk application 62 to request card data in a digital form (step 216). The front desk application 62 may range from a stand-alone encoder 64 to a complete software package running in a cloud that is operable to encode a virtual card for the room that was selected and return the virtual card data back to the hotel system (step 218).

Next, the hotel property management system 60 can make another software-to-software API call to a credential service 70 after the hotel system has authenticated the user and has allocated a room stay reservation (step 220). The pertinent information is communicated to the credential service 70 with an indication to include, for example, what hotel property, what room, what guest (e.g. User ID), what dates and also the virtual card data for the stay.

Simultaneous, or in sequence with sending the virtual card data to the credential service 70, the hotel property management service 60 communicates an indication to the user (again, through any conventional method) that the check-in is confirmed and the room is assigned (step 222).

Next, a mobile device 12 based mobile application 80 can utilize a software-to-software API in a mobile library 82 (step 224) to download credentials from the credential service 70 (step 226). The mobile library 82 can securely authenticate to the credential service 70 with a prior established shared secret that may change on every successful connection.

Once authenticated, the credential service 70 can generate at the time of the communication from the mobile library 82 the credentials for the user and encrypts into the credentials the virtual card data received in step 220 for the guest associated with this instance of the mobile library. One credential can be generated for each door or access point and the virtual card data will be the same in each of these separate credentials, but may be encrypted with a unique key for the particular door or access point. The method of encryption may be AES, 3DES, or other such encryption method. The method and type of credential used may be a compressed digital certificate or a standard based certificate like X.509 or other certificate format known to the art. That is, for example, the virtual card data is encrypted into the credential with a unique key known by the credential module 36 and know or determinable by the credential service 70.

The mobile library 82 can download and store the list of credentials on the mobile device 12 using native OS protections and additional encryption of data with device specific information, e.g., UDID, IMEI, IMSI, MAC addresses, etc. Now that the check-in is complete and the encrypted mobile credential (with virtual card data) is resident on the mobile device 12 (FIG. 2), the user can operate the access control 16 in an offline mode at any later time without the mobile device 12 being required to be connected to the credential service 70. Additional embodiments may have the mobile device 12 download a credential at the same time mobile device is communicating to access control 16 at the same time the user wishes to access their room, for example.

When the user wishes to access their room (step 228), the intent of the user may be determined as a predicted intent without requiring additional steps such as making a gesture, clicking of a button, tapping on the screen, reading a finger print, requiring password entry, etc. Under some conditions, the user may be prompted for intent and respond according to signal intent to gain access. Intent prediction can be used for "seamless" access that prevents the user from having to directly interface with the mobile device 12 at the time of access. Seamless access may include the mobile application 80 running in the "background" on a mobile device 12 where it is continuously or periodically scanning for a signal advertisement, such as Bluetooth low energy (BTLE) advertisements from in-range access controls 16 along with continuously or periodically determining an intent prediction. When there is a device nearby and the intent prediction is made, then the mobile application 80 may automatically initiate a credential transfer to the access control 16. Background scanning may be facilitated on some mobile device 12 by the mobile device 12 detecting a signal advertisement (e.g., an advertisement from access control 16 or a beacon signal (e.g., an iBeacon signal) from some other device not shown in FIGS. 1-6) and causing the mobile application 80 to run in the background and start scanning. Or, background scanning may be facilitated by a mobile device 12 detecting a geographic location based on a GPS or other locationing system, for example and based on the location detection causing the mobile application 80 to run in the background and start scanning. In addition to scanning, the application 80 can start automatically predicting intent. For example, intent prediction can be inferred by proximity of the mobile device 12 to the lock while contact with the door handle is detected. Proximity can be determined by a received signal strength (RSSI) indicator of the signal advertisement as measured by the mobile device 12 and indicated to the mobile application 80. When the intent prediction indicates the user should authenticate, the mobile application 80 can again call the software-to-software API in the mobile library 82 to initiate the secure transfer of the encrypted mobile credential to the access control 16 (step 230). While the application 80 initiates the transfer, the mobile library 82 can implement the secure transfer separately in the next step.

Secure transfer of the credential (step 232) may start with a process of the mobile library 82 listening for a signal advertisement, such as BTLE advertisements from in-range access controls 16. That is, the access controls 16 are advertising their presence on a periodic rate with advertisement data that indicates an identifier of the access control 16 and the mobile device 12 can listen and connect automatically without the person having to push a button to wake-up a sleeping, battery powered lock 16 or to get out of a vehicle to interact with a reader access point on a garage door or other device. The reader access point is another type of lock 16. Another embodiment is to use Near Field Communication (NFC) and the user 'taps' their mobile device 12 to the lock 16 and a secure credential exchange transfers the mobile credential to the access control 16 (step 232). Secure credential exchanges can be done using standard techniques such as establishing a session key, encrypting communication messages, and validating the authenticity of message sender and receiver. The mobile library 82 can initiate a wireless connection, and perform a secure transfer of the encrypted mobile credential (step 232). The secure transfer may utilize a unique session encryption key and standard cryptographic algorithms and techniques. It should be appreciated that the data can be securely transmitted over any wireless link, to include but not be limited to BTLE, zigbee, Near Field Communication, etc.

The credential module 36 can receive the encrypted mobile credential, then validate and decrypt the encrypted mobile credential to retrieve the virtual card data. The decryption and validation may include, but not be limited to, validating a digital signature, validating the type of the credential, validating that the credential identifier matches an identifier in the lock memory 32, validating a starting date and an expiring date of the credential, validating the source of the credential, etc. (step 118; FIG. 3). Once validated and decrypted, the virtual card data is extracted (step 120; FIG. 3).

The virtual card data can then be communicated via hardware and software interfaces, depending on embodiments, to the lock controller 24, which may further decrypt the virtual card data, processes the data based on lock vendor rules, then open the lock if entry is permitted (step 234). Notably, the virtual card data is communicated into the lock controller 24 as a "virtual card read" in a data format equivalent to that of a physical key card. This thus permits the continued usage of traditional guest key cards 92 such as that of a family member, or a guest that just wants a copy of the physical key card 92, along with usage of the mobile device 12.

The audit trail uploaded by the mobile device 12 can be just the audits generated by the mobile device 12 itself, or can be the unified audits including openings by the guest using a physical key card. In addition, when the lock 16 is opened, a battery status or other maintenance information thereof may be uploaded into the audit trail from the mobile device 12 to the credential service 70 so that the hotel can be notified of low battery conditions and proactively change the batteries, or perform other maintenance. Other information associated with the audit trail can include, for example, failed openings or failed attempts or credentials that failed validation.

Usage of the "virtual card read" maintains a contiguous audit trail and also maintains all the known use cases for access control that are already encoded into traditional card data. Furthermore, the credential module 36 is lock vendor agnostic, so that any lock vendor's data could be passed through to allow each lock vendor to independently innovate card data. Further, the credential module 36 may be supplied by a different company than the lock 16. And also, the server 14, mobile device 12, and credential module 36 may have no means for further decrypting or validating the card data other than treating it like a data object to be encoded, encrypted, transferred, retrieved and delivered. Additionally, the "virtual card read" can be used offline without requiring the mobile device 12 to be online with a Wi-Fi connection or real time connection to a credential service. That is, the data for the "virtual card read" is stored on the mobile device 12 and passed securely to the credential module 36 in an offline mode. This is not to limit the capability to also send the "virtual card read" in an online mode. An additional benefit is that any access controls 16 can use any card types in addition to using a credential module 36, where the card types include but are not be limited to, Magnetic strip, RFID, Proximity, etc.

In another disclosed non-limiting embodiment, the credential module 36 can be used for many purposes, to include, but not be limited to, passing data to a self-service hard-key dispenser unit 98 that produces physical key cards 92. The hard-key dispenser unit 98 has a credential module 36 that receives the virtual card data, decrypts, extracts and sends to a lock controller 24 configured to encode the data onto a physical key card 92. That is, the virtual card data on the mobile device 12 is written to a physical key card 92 by the unit 98 and dispenses the key card 92 in an automated manner. The unit 98 does not require any user interface besides the dispensing element for the key card 92 and a unit power source, including but not limited to batteries, mains power, energy harvesting, and the like. The user interface for the unit 98 is really the interface of the mobile device 12. When the unit 98 begins to run low on blank key cards 92, the mobile device 12 can upload to the credential server 70 as indication of the status that can be turned into a report to notify the hotel that the unit 98 needs to be refilled.

In other disclosed non-limiting embodiments, the virtual card data can be standard access control card data (i.e., identification data) for badge access systems, or integrated into a vending machine with the virtual card data as credit card information, tokens, purchase reference identifiers, or the like.

Figure 5:
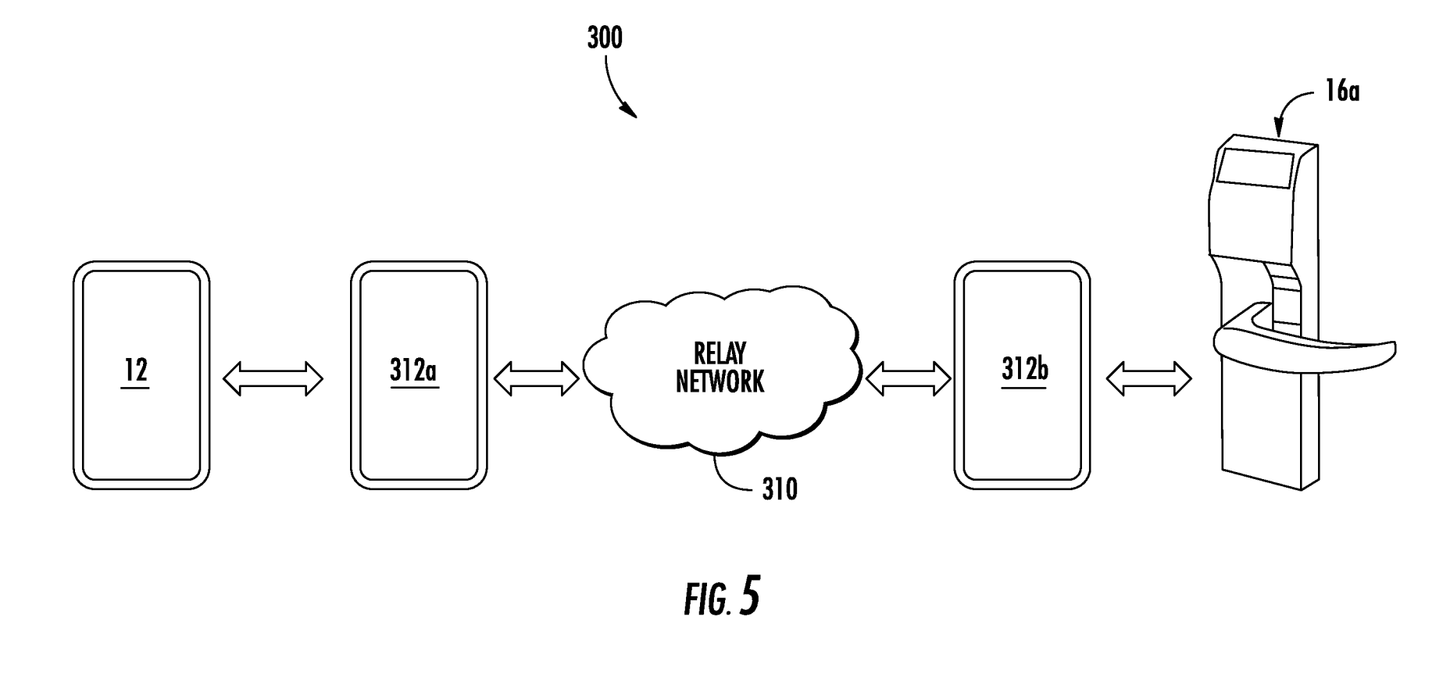
FIG. 5 illustrates a block diagram of a relay attack scenario.

Referring now to FIG. 5, while referencing FIGS. 1-4. FIG. 5 depicts an example of relay attack scenario 300 for purposes of explanation. A relay attack can occur between the mobile device 12 and the access control 16a, in the example of FIG. 5 by an attacker device 312A relaying communications intended for the access control 16a across a relay network 310 to an accomplice device 312B which locally communicates with the access control 16a. In a seamless communication system where the user of the mobile device 12 is not directly prompted to confirm an intent to have the access control 16a open a lock, the user of the mobile device 12 may be unaware of the relay communication occurring with respect to the devices 312A, 312B and the access control 16a. In order to prevent the relay attack scenario 300 from being successful, embodiments can both ensure that access attempts are constrained by being in close physical proximity between the mobile device 12 and the access control 16a as well as attempting to detect the occurrence of a relay attack during communication.

Figure 6:
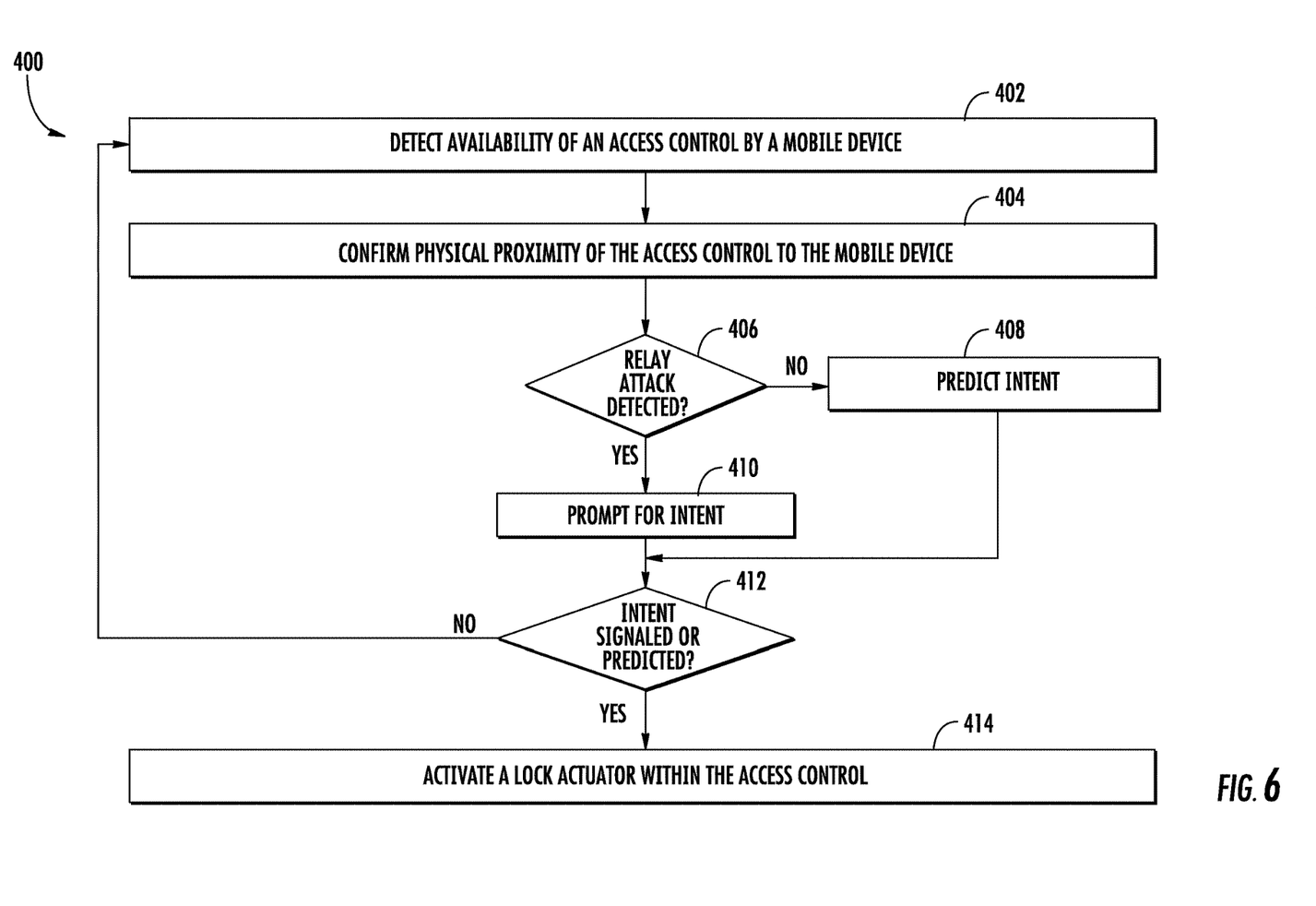
FIG. 6 is a flow diagram illustrating a secure communication process between a mobile device and an access control, according to an embodiment of the present disclosure.

FIG. 6 depicts a flow chart of method 400 of a secure communication process between a mobile device 12 and an access control 16, in accordance with an embodiment of the disclosure. Steps of the method 400 may be performed by the mobile device application 80 on the mobile device 12. It is to be understood that the intent of a user of the mobile device 12 is transferred to the mobile device application 80 when the intent of the user is detected and thus the intent of the user becomes the intent of the mobile device application 80.

At block 402, the mobile device 12 wirelessly detects availability of an access control 16a. Availability can be detected based on listening for advertisements from the access control 16a and/or sending a request and waiting for a response of availability of the access control 16a.

At block 404, the mobile device 12 confirms the physical proximity of the access control 16a to the mobile device 12. For example, the mobile device 12 can confirm physical proximity by verifying detection of at least two different signal power levels (e.g., as multiple BTLE signals transmitted at different power levels) at the mobile device 12 as transmitted by the access control 16a. For example, a first advertisement could be transmitted by the access control 16a at a very high power level and a second advertisement could be at a much lower power level. The first and second advertisements would have the same data. An attacker device 312A may only reproduce the first advertisement. As a result, the mobile device 12 can detect that the signal level pattern between advertisements is missing and determine that it is not in proximity to the access control 16. Communication for proximity confirmation and/or data transmission can utilize multiple communication channels having different communication range distances, such as NFC for proximity and Bluetooth for transmission of data. The use of different communication channel types can be combined with signal power level patterns to further enhance system robustness. As another example, physical proximity can be confirmed by verifying that a communication address (e.g., a Bluetooth address) of the access control 16a matches an expected address value by the mobile device 12. The expected address may be determined by examining data contained in the advertisement. The data may include a unique identifier of the access control 16. From this identifier the mobile device 12 can retrieve an expected communication address. The expected communication address can be retrieved from one or more locations, such as from the server 14, from a credential, and/or from data downloaded with a credential, for example. If the expected address is not matching the actual address, then the mobile device can determine that it is not in proximity to the access control 16.

At block 406, the mobile device 12 begins communication with access control 16 when the access control 16 is nearby and an intent prediction (step 228 in FIG. 4) is determined.

At block 408, the mobile device 12 can determine during communication with access control 16 whether a relay attack is detected. A relay attack can be detected by verifying whether a round-trip communication latency between the mobile device 12 and the access control 16a is at or below a predetermined latency limit. If the latency limit is exceeded (e.g., it takes too long to send a message back and forth) then an attack is detected because it takes extra time to hop between attacker device 312A and accomplice device 312B. A relay attack can also be detected by comparing a current location (e.g., using GPS data) of the access control 16a to an expected location of the access control 16a. An expected location can be determined, for instance, based on a position signal (e.g., GPS or iBeacon) and/or a last known location of the access control 16a. A relay attack can be detected by verifying that an expected audio signal output (e.g., an audio "chirp") by the access control 16a is detected by a microphone of the mobile device 12. A relay attack can be detected by both the mobile device 12 and access control 16a determining respective received signal strength indicators and exchanging the respective signal strength indicators and verifying that the signal strength indicators correlate to each other within a signal level tolerance. For example, if an attacker device 312A is far away from a mobile device 12 but an accomplice device 312B is very close to the access control 16a, then the mobile device 12 received signal strength is very low but the access control 16a signal strength is very high. This mismatch would be detected as a relay attack. A relay attack can also be detected by receiving a biometric indicator, such as a photo image, from the access control 16a of a person seeking access. By automated matching or user-assisted inspection, the mobile device 12 can be used to confirm whether the biometric indicator matches the user of the mobile device 12. When the picture of the accomplice with device 312B is compared with an expected picture of the user with the mobile device 12 the mismatch would be detected as a relay attack. With any of the examples above, if the expected information or check fails, then a relay attack has been detected.

If a relay attack is detected at block 408, then a prompt for intent at block 410 can be initiated. The prompt at block 410 may include a message shown on the screen of the mobile device 12. The prompt may include an audio sound made by the mobile device 12. The prompt may include a vibration of the mobile device 12. The user may be required to signal intent after the prompt. In an embodiment, the intent of the user of the mobile device application 80 to engage a specific access control 16a is detected after the mobile device application 80 is authenticated. In another embodiment, the intent of the user of the mobile device application 80 to engage a specific access control 16a is detected before the mobile device application 80 is authenticated. Intent may be shown by various methods. In one embodiment, intent may be shown by moving towards the access control 16 desired to enter, which may be determined by the distances between the mobile devices 12 and the access control 16. Distance can be inferred by the received signal strength. For example, if the signal strength goes up, then the mobile device 12 containing the mobile device application 80 may be moving closer. In an embodiment, the RSSI must cross a threshold to signal intent. In another embodiment, intent may be shown by tapping the mobile device 12 containing the mobile device application 80 on the specific access control 16a or another reader operably connected to the specific access control 16a. The tapping may be detected by an accelerometer in the mobile device 12 and also coupled with a very high RSSI that shows which access control 16 is being tapped upon. In another embodiment, intent may also be inferred based upon past behavior, such as, for example, a mobile device 12 containing the mobile device application 80 typically enters the building through a specific entrance with a corresponding access control 16. In yet another embodiment, intent may be shown by a user making a selection on a screen of the mobile device 12 through the mobile device application 80. For example, a list of names of one or more access controls 16 may display on the screen and the user may select one of the access controls 16.

If a relay attack is not detected at block 408, the prompt for intent 410 can be skipped and the prediction of intent from block 406 can be used at block 412. At block 412, if intent is signaled at block 410 or intent is predicted at block 406, then block 414 can be performed; otherwise, the flow can return back up to block 402 to continue monitoring. At block 414, a lock actuator 22 within the access control 16a is activated.

In embodiments where the access control 16 is part of a component of a vehicle, the mobile device 12 can verify whether a location of the mobile device 12 and a location of the vehicle remain aligned as the vehicle moves (e.g., using GPS information). If they do not, then a relay attack may have happened and the vehicle is being moved without the user and mobile device 12 being present within the vehicle. A periodic re-authentication can be performed as the vehicle moves. The mobile device 12 can periodically confirm whether communication between the access control 16 of the vehicle and the mobile device 12 remains active. If the communication is not active then a relay attack may have happened and the vehicle is being moved without the user and mobile device 12 being present within the vehicle.

In an embodiment, the lock actuator 22 may only be activated when the mobile device 12 containing the mobile device application 80 is a selected distance away from the specific access control 16a. Distance can be determined by many different methods including but not limited to detecting the level of received signal strength through RSSI to determine distance; an indoor locating system that may or may not utilize Bluetooth (ex: WiFi); a GPS system; and by any other means known to one of skill in the art of determining distance from a mobile device to another device.

While the above description has described the flow process of FIG. 3-6 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of providing secure access through a wireless connection, the method comprising:
    detecting availability of an access control wirelessly by a mobile device;
    predicting that a user of the mobile device seeks to have the access control open a lock without requesting a response from the user through the mobile device;
    confirming physical proximity of the access control to the mobile device by verifying detection of at least two different signal power levels at the mobile device as transmitted by the access control and confirming that a communication address of the access control matches an expected address value by the mobile device;
    when the physical proximity between the access control to the mobile device is confirmed, determining whether a relay attack is detected;
    based on detection of the relay attack:
        outputting a prompt through the mobile device;
        confirming that the user of the mobile device seeks to have the access control open the lock based on a detected response of the user to the prompt; and
        activating a lock actuator through the access control to open the lock responsive to a credential based on affirmatively confirming; and
    based on non-detection of the relay attack, activating the lock actuator through the access control to open the lock responsive to the credential based on the predicting.

2. The method of claim 1, wherein determining whether the relay attack is detected comprises:
    verifying whether a round-trip communication latency between the mobile device and the access control is at or below a predetermined latency limit.

3. The method of claim 1, wherein determining whether the relay attack is detected comprises:
    comparing a current location of the access control to an expected location of the access control.

4. The method of claim 3, wherein the expected location of the access control is determined based on one or more of: a position signal and a last known location of the access control.

5. The method of claim 1, wherein determining whether the relay attack is detected comprises:
    verifying that an expected audio signal output by the access control is detected by a microphone of the mobile device.

6. The method of claim 1, wherein determining whether the relay attack is detected comprises:
    determining a received signal strength indicator at the mobile device; and
    verifying whether the receive signal strength indicator at the mobile device matches a received signal strength indicator of the access control within a signal level tolerance.

7. The method of claim 1, wherein determining whether the relay attack is detected comprises:
    receiving a biometric indicator from the access control of a person seeking access; and
    confirming whether the biometric indicator matches the user of the mobile device.

8. The method of claim 1, wherein determining whether the relay attack is detected comprises:
    utilizing multiple communication channels having different communication range distances to confirm proximity and transmit data.

9. The method of claim 1, wherein the access control is a component of a vehicle and further comprising:
    verifying whether a location of the mobile device and a location of the vehicle remain aligned as the vehicle moves;
    performing a periodic re-authentication as the vehicle moves; and
    periodically confirming whether communication between the vehicle and the mobile device remains active.

10. An access control system comprising:
    an access control operable to control a lock actuator to open a lock; and
    a mobile device application executable by a mobile device and configured to:
        detect availability of the access control wirelessly by the mobile device;
        predict that of a user of the mobile device seeks to have the access control open the lock without requesting a response from the user through the mobile device;
        confirm physical proximity of the access control to the mobile device by verifying detection of at least two different signal power levels at the mobile device as transmitted by the access control and confirming that a communication address of the access control matches an expected address value by the mobile device;
        when the physical proximity between the access control to the mobile device is confirmed, determine whether a relay attack is detected;
        based on detection of the relay attack:
            output a prompt through the mobile device;
            confirm that the user of the mobile device seeks to have the access control open the lock based on a detected response of the user to the prompt; and
            activate the lock actuator through the access control to open the lock responsive to a credential based on affirmatively confirming; and
        based on non-detection of the relay attack, activate the lock actuator through the access control to open the lock responsive to the credential based on the prediction.

11. The access control system of claim 10, wherein determination of whether the relay attack is detected comprises:
    verifying whether a round-trip communication latency between the mobile device and the access control is at or below a predetermined latency limit.

12. The access control system of claim 10, wherein determination of whether the relay attack is detected comprises:
    comparing a current location of the access control to an expected location of the access control, wherein the expected location of the access control is determined based on one or more of: a position signal and a last known location of the access control.

13. The access control system of claim 10, wherein determination of whether the relay attack is detected comprises:
    verifying that an expected audio signal output by the access control is detected by a microphone of the mobile device.

14. The access control system of claim 10, wherein determination of whether the relay attack is detected comprises:
   determining a received signal strength indicator at the mobile device; and
   verifying whether the receive signal strength indicator at the mobile device matches a received signal strength indicator of the access control within a signal level tolerance.

15. The access control system of claim 10, wherein determination of whether the relay attack is detected comprises:
   receiving a biometric indicator from the access control of a person seeking access; and
   confirming whether the biometric indicator matches the user of the mobile device.

16. The access control system of claim 10, wherein determination of whether the relay attack is detected comprises:
   utilizing multiple communication channels having different communication range distances to confirm proximity and transmit data.

17. The access control system of claim 10, wherein the access control is a component of a vehicle and the mobile device application executable by the mobile device is configured to:
   verify whether a location of the mobile device and a location of the vehicle remain aligned as the vehicle moves;
   perform a periodic re-authentication as the vehicle moves; and
   periodically confirm whether communication between the vehicle and the mobile device remains active.

* * * * *